(12) United States Patent
Hunter et al.

(10) Patent No.: US 8,324,135 B2
(45) Date of Patent: Dec. 4, 2012

(54) AQUEOUS FLUID AND METHOD OF MAKING AND USING THE SAME

(75) Inventors: Robert W. Hunter, Burnsville, MN (US); Jean-Marie Ruckebusch, Douai (FR); Adriana Paiva, Richmond, TX (US)

(73) Assignee: 3M Innovative Properties Company, Saint Paul, MN (US)

( * ) Notice: Subject to any disclaimer, the term of this patent is extended or adjusted under 35 U.S.C. 154(b) by 247 days.

(21) Appl. No.: 12/521,096

(22) PCT Filed: Dec. 21, 2007

(86) PCT No.: PCT/US2007/088511
§ 371 (c)(1),
(2), (4) Date: Dec. 1, 2009

(87) PCT Pub. No.: WO2008/083063
PCT Pub. Date: Jul. 10, 2008

(65) Prior Publication Data
US 2010/0093564 A1    Apr. 15, 2010

Related U.S. Application Data

(60) Provisional application No. 60/882,342, filed on Dec. 28, 2006.

(51) Int. Cl.
*C09K 8/08* (2006.01)

(52) U.S. Cl. ......... 507/110; 507/140; 507/206; 507/269
(58) Field of Classification Search ................. 507/110, 507/140, 206, 269
See application file for complete search history.

(56) References Cited

U.S. PATENT DOCUMENTS

| | | | |
|---|---|---|---|
| 2,978,340 A | 4/1961 | Veatch et al. | |
| 3,030,215 A | 4/1962 | Veatch et al. | |
| 3,129,086 A | 4/1964 | Veatch et al. | |
| 3,230,064 A | 1/1966 | Veatch et al. | |
| 3,365,315 A | 1/1968 | Beck | |
| 3,463,231 A | 8/1969 | Hutchison et al. | |
| 3,819,519 A | 6/1974 | Sharman et al. | |
| 4,279,632 A | 7/1981 | Frosch et al. | |
| 4,391,646 A | 7/1983 | Howell | |
| 4,767,726 A | 8/1988 | Marshall | |
| 5,658,861 A * | 8/1997 | Nelson et al. | 507/200 |
| 6,214,773 B1 | 4/2001 | Harris et al. | |
| 6,906,009 B2 * | 6/2005 | Shinbach et al. | 507/117 |
| 7,084,093 B2 | 8/2006 | Crews | |
| 2003/0236171 A1 * | 12/2003 | Nguyen et al. | 507/100 |
| 2006/0205605 A1 | 9/2006 | Dessinges et al. | |

FOREIGN PATENT DOCUMENTS
EP   0 091 555   10/1983

\* cited by examiner

*Primary Examiner* — Alicia Toscano
(74) *Attorney, Agent, or Firm* — C. Michael Geise

(57) ABSTRACT

Aqueous fluids comprising polysaccharide, dissolved salt, and borate anions. The fluids are useful, for example, as a drilling fluid.

13 Claims, No Drawings

AQUEOUS FLUID AND METHOD OF MAKING AND USING THE SAME

CROSS REFERENCE TO RELATED APPLICATIONS

This application is a national stage filing under 35 U.S.C. 371 of PCT/US2007/088511, filed Dec. 21, 2007, which claims priority to Application No. 60/882,342, filed Dec. 28, 2006, the disclosure of which is incorporated by reference in its/their entirety herein.

BACKGROUND

In oil drilling operations, a drilling fluid is typically circulated downwardly through a drill string to cool and lubricate the drill string, suspend the cuttings removed from the well bore, and to keep out formation fluids.

Both aqueous and oil-based drilling fluid systems are known. The more economical aqueous systems are used when practicable with oil-based systems being used where increased lubricity at the drilling head is desirable or when traversing formations which would be adversely affected by a water-based system, such as water soluble shale formations.

Aqueous drilling fluids typically comprise a viscosifying agent, generally a clay (e.g., a solid phase bentonite, attapulgite, or sepiolite), and a water fluid vehicle. In addition, salt or salt water can be added to the components of the drilling fluid to prepare a salt water drilling fluid. Various additives are also commonly employed to control viscosity, yield point, gel strength (thixotropic properties), pH, fluid loss, tolerance to contaminants (e.g., salt and calcium carbonate), lubricating properties, filter caking properties, cooling and heat transfer properties, and tolerance to inactive solids such as sand and silt or active native mud making clays (e.g., smectites, illites, kaolinites, chlorites, etc.). Clays are not usually used as the sole viscosifying agent, and typically organic water-soluble polymers (e.g., starch, carboxymethylcellulose, natural gums, or synthetic resins) are used in conjunction with clays. These polymers also aid the clay component of the drilling fluid to serve as a filtration aid to prevent or retard the drilling fluid from being lost into the formation.

Some well operators have used hollow microspheres (also referred to as "bubbles") to reduce the density of the drilling fluid (mud). Certain combinations of aqueous drilling fluids (e.g., those comprising polysaccharides and dissolved salt (e.g., dissolved NaCl and $CaCl_2$)) and certain glass bubbles (e.g., soda-lime-borosilicate glasses such as those marketed by 3M Company, St. Paul, Minn., under the trade designation "HGS18000") undesirably tend to form a gel, rather than remain as a liquid. There is a need to provide such combinations of materials together that do not gel (i.e., remain fluid).

SUMMARY

Surprisingly, although not wanting to be bound by theory, Applicants believe they have discovered that the reason certain combinations of aqueous drilling fluids (e.g., those comprising polysaccharide and dissolved salt (e.g., dissolved NaCl and $CaCl_2$)) and glass bubbles (e.g., those marketed by 3M Company under the trade designation "HGS18000") undesirably tend to form a gel is due to reaction of at least the polysaccharide and borate anion comprising at least one boron atom and at least two oxygen atoms. The borate anion, or at least a source thereof, is present, for example, on the outer surface and/or in the ceramic of some ceramic bubbles (e.g., those marketed by 3M Company under the trade designation "HGS 18000").

Fluids described herein (wherein it is understood that "fluids" referred to herein have a continuous phase of liquid) are useful as drilling fluids. In one exemplary method of performing a drilling operation, the method comprises circulating an aqueous drilling fluid according to the present invention in a wellbore penetrating a subterranean zone.

In one embodiment, the present invention provides a method of making a low density fluid. The method comprises combining (a) an aqueous fluid comprising polysaccharide and dissolved salt, (b) borate anions comprising at least one boron atom and at least two oxygen atoms, (c) ceramic (i.e., any of glass, crystalline ceramics, glass-ceramics, and combinations thereof) bubbles (also referred to as "hollow ceramic microspheres"), and (d) organic material that preferentially reacts with the borate anions as compared to the polysaccharide, to provide the low density fluid, wherein in the absence of the organic material, the low density fluid gels within 16 hours, at 20° C. (i.e., in the absence of the organic material the modified fluid gels, and the amount of organic material is sufficient to prevent the modified fluid from gelling within 16 hours, at 20° C.). Typically, the low density fluid remains a fluid for at least 2, 3, 4, 5, 6, 7, 8, 9, or even 10 days.

In one embodiment, the present invention provides a method of making a modified aqueous fluid (e.g., a drilling fluid). The method comprises combining an aqueous fluid comprising (a) polysaccharide and dissolved salt (e.g., dissolved NaCl and $CaCl_2$), (c) borate anions comprising at least one boron atom and at least two oxygen atoms, and (d) organic material that preferentially reacts with the borate anions as compared to the polysaccharide, to provide a modified aqueous fluid (e.g., a modified drilling fluid), wherein in the absence of the organic material the modified aqueous fluid gels within 16 hours, at 20° C. Typically, the aqueous fluid remains a fluid for at least 2, 3, 4, 5, 6, 7, 8, 9, or even 10 days. Optionally, the aqueous fluid further comprises ceramic bubbles.

Optionally, the aqueous fluid further comprises gas bubbles (i.e., the aqueous fluid is foamed).

In one embodiment, the present invention provides an aqueous fluid (e.g., a drilling fluid) comprising the reaction product of at least borate anions comprising at least one boron atom and at least two oxygen atoms and organic material that preferentially reacts with the borate anions as compared to polysaccharide present in the fluid. In some embodiments, in the absence of the organic material that formed the reaction product, the aqueous composition would gel within 16 hours, at 20° C., and wherein the amount of organic material forming the reaction product was sufficient to prevent the aqueous composition from gelling. Typically, the aqueous fluid remains a fluid for at least 2, 3, 4, 5, 6, 7, 8, 9, or even 10 days. In some embodiments, the aqueous fluid further comprises dissolved salt. Optionally, the aqueous fluid further comprises ceramic bubbles. Optionally, the aqueous fluid further comprises gas bubbles (i.e., the aqueous fluid is foamed).

The present invention also provides a method of performing drilling operations. The method comprises circulating an aqueous drilling fluid comprising the reaction product of at least borate anions comprising at least one boron atom and at least two oxygen atoms and organic material that preferentially reacts with the borate anions as compared to polysaccharide present in the fluid, in a wellbore penetrating a subterranean zone. Optionally, the aqueous drilling fluid further comprises ceramic bubbles. Optionally, the aqueous fluid further comprises gas bubbles (i.e., the aqueous fluid is foamed).

Examples of the organic material referred to above with respect to the invention, which may prevent, or at least inhibit, gelling in certain concentrations, include monosaccharides (including aldoses (e.g., glucose, mannose, or xylose) and ketoses (e.g., fructose)); sugar alcohols (e.g., sorbitol or maltitol); disaccharides (e.g., maltose); amino sugars (e.g., glucosamine); sugar acids (i.e., aldonic acids (e.g., gluconic acid)); compounds (including linear and branched) containing at least three functional groups selected from the group consisting of hydroxyl functional groups, carboxylic acid functional groups, and combinations thereof (e.g., erythorbic acid, phloroglucinol, glycerol, meso-erythritol, pentaerythritol, citric acid, 1,1,1-tris(hydroxymethyl)ethane); 1,6-hexanediol; phthalic acid; and hydantoin. The term "organic material" includes these compounds in any of their stereoisomeric (e.g., enantiomeric or diasteromeric), solvated (e.g., hydrated), and/or salt (e.g., in the case of amino sugars, sugar acids, or other carboxylic acids) forms. When referring to chiral compounds, each of the compound's enantiomers as well as racemic or scalemic mixtures of the enantiomers are included.

Further, in one embodiment, the present invention provides a method of making a low density fluid. The method comprises combining (a) an aqueous fluid comprising polysaccharide and dissolved salt, (b) soda-lime-borosilicate glass bubbles, and (c) at least one of monosaccharides; sugar alcohols; disaccharides; amino sugars; sugar acids; compounds containing at least three functional groups selected from the group consisting of hydroxyl functional groups, carboxylic acid functional groups, and combinations thereof; 1,6-hexanediol; phthalic acid; or hydantoin, to provide a low density aqueous fluid, wherein in the absence of the at least one of monosaccharides; sugar alcohols; disaccharides; amino sugars; sugar acids; compounds containing at least three functional groups selected from the group consisting of hydroxyl functional groups, carboxylic acid functional groups, and combinations thereof; 1,6-hexanediol; phthalic acid; or hydantoin, the low density fluid gels within 16 hours, at 20° C. Typically, the low density fluid remains a fluid for at least 2, 3, 4, 5, 6, 7, 8, 9, or even 10 days. Optionally, the fluid further comprises gas bubbles (i.e., the aqueous fluid is foamed).

DETAILED DESCRIPTION

Aqueous fluids (e.g., a drilling fluids) comprising polysaccharide useful for the present invention are known in the art, and are available commercially, for example, from Baker Hughes, Houston, Tex.; M-I LLC, Houston, Tex.; and Haliburton, Houston, Tex.

Exemplary polysaccharides present in the aqueous fluids include at least one of xanthan gum, guar gum, starch, or cellulose (e.g., polyanioninc cellulose). Exemplary dissolved salts which may be present in the fluids include NaCl and $CaCl_2$.

In some embodiments, the aqueous fluids (e.g., typically for drilling fluid) include a viscosifying component in an amount sufficient to increase the viscosity of the composition. Exemplary viscosifying components include bentonite, asbestos, sepiolite, attapulgite, cellulose derivatives, and combinations thereof.

In some embodiments, the borate anions include monoborate and polyborate anions and anions comprising at least 2, 3, 4, 5, or even at least 6 boron atoms, which may be trivalent or tetravalent, and at least 3, 4, 5, 6, 7, 8, 9 or even at least 10 oxygen atoms. Exemplary sources of borate anions comprising at least one boron atom and at least two oxygen atoms include boric acid, borax (i.e., sodium tetraborate decahydrate), other boric acid salts (including solvated or hydrated forms), and soda-lime-borosilicate glass bubbles. Exemplary borate counter-ions include alkali metal cations, alkaline earth metal cations, and combinations thereof.

Exemplary organic materials that preferentially react with the borate anions as compared to the polysaccharide include at least one of sorbitol (e.g., D-sorbitol), D-(+)glucosamine hydrochloride, hydantoin, erythorbic acid, phloroglucinol dihydrate, meso-erythritol, pentaerythritol, D-gluconic acid, phthalic acid, citric acid monohydrate, 1,1,1-tris(hydroxymethyl)ethane, D-fructose, D-glucose anhydrous, xylose, maltitol (e.g., 70% maltitol in water), D-(+)-mannose, and high fructose corn syrup. Such materials are commercially available, for example, from Alfa Aesar, Ward Hill, Mass.; Calbiochem, La Jolla, Calif.; Aldrich Chemical Company, Milwaukee, Wis.; Pfizer Chemical Division, New York, N.Y.; Fisher Scientific Co, Fair Lawn, N.J.; Merck Co., Inc, Rahway, N.J.; Avocado Research Chemicals, Ltd., Heysham, Lancaster, UK; and/or The Matheson Co. Inc., East Rutherford, N.J.

Ceramic bubbles useful in practicing the present invention are typically generally round. The bubbles need not be perfectly spherical, and may, for example, be cratered or ellipsoidal. Suitable ceramic bubbles can be made by techniques known in the art and/or are commercially available. For example, techniques for making glass bubbles are reported, for example, in U.S. Pat. No. 2,978,340 (Veatch et al.), U.S. Pat. No. 3,030,215 (Veatch et al.), U.S. Pat. No. 3,129,086 (Veatch et al.), U.S. Pat. No. 3,230,064 (Veatch et al.), U.S. Pat. No. 3,365,315 (Beck), U.S. Pat. No. 4,279,632 (Howell), U.S. Pat. No. 4,391,646 (Howell), and U.S. Pat. No. 4,767,726 (Marshall), and European Pat. Doc. No. 0 091,555, published Oct. 19, 1983. A variety of glass bubble formulations are known in the art, including various soda-lime-borosilicate glasses. For example, one exemplary soda-lime-borosilicate glass bubble formulation comprises, by weight, at least 90%, 94%, or even 97% of glass that in turn comprises at least 67% $SiO_2$, (e.g., a range of 70% to 80% $SiO_2$), a range of 8% to 15% CaO, a range of 3% to 8% $Na_2O$, a range of 2% to 6% $B_2O_3$, and a range of 0.125% to 1.5% $SO_3$.

Glass bubbles are commercially available, for example, from 3M Company, St. Paul, Minn. under the trade designations "3M HOLLOW GLASS MICROSPHERES, HGS SERIES" (e.g., "HGS18000") and "3M GLASS BUBBLES" (e.g., grades S60, S60HS, iM30K, K1, K15, S15, S22, K20, K25, S32, K37, S38, S38HS, S38XHS, K46, (A16/500, A20/1000, D32/4500, and H50/10000); and from Potters Industries, Valley Forge, Pa., (an affiliate of PQ Corporation) under the trade designation "SPHERICEL HOLLOW GLASS SPHERES" (e.g., grades 110P8 and 60P18) and "Q-CEL HOLLOW SPHERES" (e.g., grades 30, 6014, 6019, 6028, 6036, 6042, 6048, 5019, 5023, and 5028); and from Silbrico Corp., Hodgkins, Ill. under the trade designation "SIL-CELL" (e.g., grades SIL 35/34, SIL-32, SIL-42, and SIL-43).

In some embodiments, the ceramic bubbles are aluminosilicate bubbles extracted from pulverized fuel ash collected from coal-fired power stations (i.e., cenospheres). Useful cenospheres include those marketed by Sphere One, Inc., Chattanooga, Tenn., under the trade designation "EXTENDOSPHERES HOLLOW SPHERES" (e.g., grades SG, MG, CG, TG, HA, SLG, SL-150, 300/600, 350, XOL-200, XOL-150, FM-1); and those marketed by 3M Company under the trade designation "3M HOLLOW CERAMIC MICRO- SPHERES" (e.g., grades G-3125, G-3150, and G-3500). Cenospheres typically have average true densities in a range from 0.7 g/cm$^3$ to 0.8 g/cm$^3$.

Typically, the ceramic bubbles have average true densities in a range from about 0.1 g/cm$^3$ to about 0.9 g/cm$^3$ (in some embodiments, in a range from about 0.2 g/cm$^3$ to about 0.7 g/cm$^3$), although densities outside of these ranges may also be useful.

Typically, the glass bubbles have diameters in a range from about 5 micrometers to about 250 micrometers (in some embodiments, in a range from about 10 micrometers to about 110 micrometers, or even about 10 micrometers to about 70 micrometers), although sizes outside of these ranges may also be useful. In some embodiments, the glass bubbles have median diameters in a range from 20 micrometers to about 40 micrometers. Typically, the ceramic bubbles such as cenospheres have diameters in a range from about 5 micrometers to about 500 micrometers (in some embodiments, in a range from about 50 micrometers to about 300 micrometers, or even about 75 micrometers to about 200 micrometers), although sizes outside of these ranges may also be useful.

For drilling fluids comprising ceramic bubbles, typically the amount of bubbles present are sufficient to reduce the density of the fluid at least 5% (in some embodiments, at least 10%, 15%, 20%, 25%, or even at least 30%). In some embodiments, the ceramic bubbles comprise in a range from about 25 to about 50 percent by volume of the drilling fluid. Reducing the density of the drilling fluid is advantageous, for example, by significantly reducing the pressures required to raise the drilling fluid to the surface, as well as in reducing the associated pumping costs.

The compressive strength required of the ceramic bubbles is dependent on the particular intended use of the fluid. For example in drilling applications, the compressive strength required of the ceramic bubbles is typically dictated by the bottom hole pressure in which it will be employed. At shallow depths, the compressive strength of the ceramic bubbles does not have to be high, but in very deep wellbores, and/or at very great depths under the sea, the hydrostatic pressure exerted on the ceramic bubbles becomes enormous, and the ceramic bubbles should have very high resistance to collapse (high compressive strengths). Bubbles, because of their generally spherical form, provide resistance to compression equally from all directions (isotropic compressive strength), and are ideally suited for this application. Generally, the ceramic bubble component has a collapse strength of at least 2000 psi (13.8 MPa) (in some embodiments at least 3000 psi (20.7 MPa), 4000 psi (27.6 MPa), 5500 psi (37.9 MPa), 6000 psi (41.1 MPa), 10,000 psi (68.9 MPa), or at least even 18,000 psi (124.1 MPa)).

Embodiments of low density aqueous fluids according to the present invention are also useful, for example in dual gradient drilling. In this type of deep water drilling, the low density aqueous fluid is introduced at the base of a riser at or near the seafloor, to facilitate pressure control in the drilling operations.

Other additives that may be included in fluids described herein include alkalinity and pH control additives, bactericides, calcium reducers, corrosion inhibitors, defoamers, emulsifiers, filtrate reducers, flocculants, foaming agents, hydrate suppressants, lost circulation materials, lubricants/pipe-freeing agents, shale control inhibitors, surface active agents, temperature stability agents, thinners, dispersants, viscosifiers, and weighting materials.

Optionally, mixing gas (e.g., nitrogen, carbon dioxide, or air) bubbles into fluids to form foams can be carried out using one of several methods known in the art. Such methods include those described, for example, in U.S. Pat. No. 3,463,231 (Hutchison et al.) and U.S. Pat. No. 3,819,519 (Sharman et al.).

The present invention also provides a method of drilling, the method comprising circulating a drilling fluid described herein down a drill string and up an annulus between the drill string and borehole.

The present invention also provides a method of drilling wherein the pressure of the drilling fluid may be controlled to prevent blowouts, kicks or other uncontrolled pressure conditions. Under most well drilling applications in permeable formations, the drilling fluid pressure should be kept between the pore pressure of the well and the fracturing pressure of the surrounding well formation. If the fluid pressure is too low, the formation fluid can force the fluid from the wellbore or annulus resulting in a kick or blowout. If the fluid pressure is too high the formation adjacent the well bore may fracture resulting in loss of fluid circulation and loss of fluid and cuttings to the fracture. Glass bubbles can be used to control the density of aqueous drilling fluids, and therefore to control the pressure the fluid exerts on the formation.

The following examples are offered to aid in the understanding of the present invention and are not to be construed as limiting the scope thereof. Unless otherwise indicated, all parts and percentages are by weight.

EXAMPLES

Fluid-Gel Test

Whether a material was fluid can be verified using the following "Fluid-Gel Test". About 10 cm$^3$ of the material to be tested is introduced, after being thoroughly shaken in its container, at about 20° C., into a 75 mm, short stem, 60° glass funnel (available under the trade designation "Pyrex"; catalog # 4154-11, from Ace Glass, Vineland, N.J.) If the material passes through the funnel within 1 minute, the material is considered a fluid; otherwise it is a gel.

Example 1

100 grams of an aqueous drilling fluid, based on saturated salt (sodium chloride) water, and rheologically modified with polysaccharide (obtained from Baker Hughes, Aberdeen, Scotland (UK) under the identifier "Water Based Mud"), was mixed by hand with 3 grams of D-sorbitol (CAS # 50-70-4; D-sorbitol 98%; obtained from Alfa Aesar, Ward Hill, Mass.) in an 8 ounce (240 ml) glass jar. 10 grams of ceramic microspheres ("3M HOLLOW GLASS MICROSPHERES HGS18000") was then mixed into the fluid by hand. The jar was sealed, and allowed to stand at room temperature (about 20° C.) overnight. After about 16 hours, the fluid was observed to remain as a fluid, with a small but perceptible increase in viscosity. The mixture was still free flowing after at least 18 days.

Further, the mixture (after at least 18 days) was tested according to the Fluid-Gel Test described above, and designated a fluid.

Example 2

Example 2 was prepared and tested as described in Example 1, except 3 grams of D-(+)-glucosamine hydrochloride (CAS # 66-84-2; obtained from Calbiochem, La Jolla, Calif.) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 3

Example 3 was prepared and tested as described in Example 1, except 3 grams of hydantoin (CAS # 461-72-3; 99%; obtained from Aldrich Chemical Company, Milwaukee, Wis.) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 4

Example 4 was prepared and tested as described in Example 1, except 3 grams of erythorbic acid (obtained from Pfizer Chemical Division, New York, N.Y.) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 5

Example 5 was prepared and tested as described in Example 1, except 3 grams of phloroglucinol dihydrate (CAS # 6099-90-7; 97%; obtained from Aldrich Chemical Company) was used in place of the D-sorbitol. After about at least 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 6

Example 6 was prepared and tested as described in Example 1, except 3 grams of meso-erythritol (obtained from Aldrich Chemical Company) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 7

Example 7 was prepared and tested as described in Example 1, except 3 grams of pentaerythritol (Purified Grade; obtained from Fisher Scientific Co, Fair Lawn, N.J.) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 8

Example 8 was prepared and tested as described in Example 1, except 3 grams of D-gluconic acid, potassium salt (CAS # 299-27-4; 99%; obtained from Aldrich Chemical Company) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 9

Example 9 was prepared and tested as described in Example 1, except 3 grams of phthalic acid (CAS # 88-99-3; 98%; obtained from Aldrich Chemical Company) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 10

Example 10 was prepared and tested as described in Example 1, except 3 grams of citric acid monohydrate (ACS, 99.0-102.0%; obtained from Alfa Aesar) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 11

Example 11 was prepared and tested as described in Example 1, except 3 grams of 1,1,1-tris(hydroxymethyl) ethane (CAS # 77-85-0; 99%; obtained from Aldrich Chemical Company) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 12

Example 12 was prepared and tested as described in Example 1, except 3 grams of D-fructose (98%; obtained from Aldrich Chemical Company) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 13

Example 13 was prepared and tested as described in Example 1, except 3 grams of D-glucose anhydrous (obtained from Merck Co., Inc, Rahway, N.J.) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 14

Example 14 was prepared and tested as described in Example 1, except 3 grams of D-xylose (CAS # 58-86-6; obtained from Avocado Research Chemicals, Ltd., Heysham, Lancaster, UK) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 15

Example 15 was prepared and tested as described in Example 1, except 3 grams of 70% maltitol in water (obtained from Aldrich Chemical Company) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 16

Example 16 was prepared and tested as described in Example 1, except 3 grams of D-(+)-mannose (obtained from The Matheson Co. Inc., East Rutherford, N.J.) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 17

Example 17 was prepared and tested as described in Example 1, except 3 grams of high fructose corn syrup (026550; obtained under the trade designation "INVERTOSE" from Corn Products, Bedford Park, Ill.) was used in place of the D-sorbitol. After at least about 16 hours, the fluid was observed to remain as a fluid, with a small but perceptible increase in viscosity. The mixture was still free flowing after at least 7 days.

Further, the mixture (after at least 10 days) was designated a fluid when tested according to the Fluid-Gel Test described above.

Example 18

Example 18 was prepared and tested as described in Example 1, except 10 grams of the aqueous drilling fluid was mixed by hand in a 6 dram vial with 1 gram of D-(+)-maltose monohydrate (obtained from Aldrich Chemical Company) and 1 gram of ceramic microspheres ("3M HOLLOW GLASS MICROSPHERES HGS18000"). After at least about 20 hours, the mixture was found to be a fluid when tested according to the Fluid-Gel test described above.

Example 19

Example 19 was prepared and tested as described in Example 18, except 10 grams of the aqueous drilling fluid was mixed by hand in a 6 dram vial with 1 gram of glycerol (obtained from Alfa Aesar) and 1 gram of ceramic microspheres ("3M HOLLOW GLASS MICROSPHERES HGS18000"). After at least about 20 hours, the mixture was found to be a fluid when tested according to the Fluid-Gel test described above.

Example 20

Example 20 was prepared and tested as described in Example 18, except 10 grams of the aqueous drilling fluid was mixed by hand in a 6 dram vial with 0.1 gram of D-sorbitol and 1 gram of ceramic microspheres ("3M HOLLOW GLASS MICROSPHERES HGS 18000"). After at least about 10 days, the mixture was found to be a fluid when tested according to the Fluid-Gel Test described above.

Example 21

Example 21 was prepared and tested as described in Example 18, except 10 grams of the aqueous drilling fluid was mixed by hand in a 6 dram vial with 0.3 gram of D-sorbitol and 0.1 gram of borax (obtained as borax under the trade designation "20 MULE TEAM" from Dial Corp. Scottsdale, Ariz.) was used in place of the Glass Bubbles. After at least about 10 days, the mixture was found to be a fluid when tested according to the Fluid-Gel Test described above.

Example 22

Example 22 was prepared and tested as described in Example 18, except 5 grams of 1,6-hexanediol was used in place of the D-sorbitol. After at least about 20 hours, the mixture was found to be a fluid when tested according to the Fluid-Gel Test described above, with the further observation that there was a significant amount of precipitated solids present in the mixture.

Illustrative Example A 100 grams of an aqueous drilling fluid, based on saturated salt (sodium chloride) water, and rheologically modified with polysaccharide (see Example 1), was mixed by hand with 10 grams of ceramic microspheres ("3M HOLLOW GLASS MICROSPHERES HGS18000"). The jar was sealed, and allowed to stand at room temperature (about 20° C.) overnight. After about 16 hours, the fluid was observed to be a gelled mass, no longer fluid, which could be easily cut with a wooden stick. This gel is similar to a soft gelatin which will not flow under its own weight, and hence clearly would not flow through the funnel in 1 minute if tested using the Fluid-Gel Test described above.

Illustrative Example B

Illustrative Example B was prepared and tested as described in Example 1, except 3 grams of dipentaerythritol (CAS # 126-58-9; tech.; obtained from Aldrich Chemical Company) was used in place of the D-sorbitol. After about 16 hours, the fluid was observed to be a gelled mass, no longer fluid, which could be easily cut with a wooden stick. This gel is similar to a soft gelatin which will not flow under its own weight, and hence clearly would not flow through the funnel in 1 minute if tested using the Fluid-Gel Test described above.

Illustrative Example C

Illustrative Example C was prepared and tested as described in Example 1, except 3 grams of 1,6-hexanediol (99+%; obtained from Aldrich Chemical Company) was used in place of the D-sorbitol. After about 16 hours, the fluid was observed to be a gelled mass, no longer fluid, which could be easily cut with a wooden stick. This gel is similar to a soft gelatin which will not flow under its own weight, and hence clearly would not flow through the funnel in 1 minute if tested using the Fluid-Gel Test described above.

Illustrative Example D

Illustrative Example D was prepared and tested as described in Example 1, except 3 grams of D-(+)-maltose monohydrate (obtained from Aldrich Chemical Company) was used in place of the D-sorbitol. After about 16 hours, the fluid was observed to be a gelled mass, no longer fluid, which could be easily cut with a wooden stick. This gel is similar to a soft gelatin which will not flow under its own weight, and hence clearly would not flow through the funnel in 1 minute if tested using the Fluid-Gel Test described above.

Illustrative Example E

Illustrative Example E was prepared and tested as described in Example 1, except 3 grams of sucrose (sugar; obtained from Super Value Inc., Eden Prairie, Minn.) was used in place of the D-sorbitol. After about 16 hours, the fluid was observed to be a gelled mass, no longer fluid, which could be easily cut with a wooden stick. This gel is similar to a soft gelatin which will not flow under its own weight, and hence clearly would not flow through the funnel in 1 minute if tested using the Fluid-Gel Test described above.

Illustrative Example F

Illustrative Example F was prepared and tested as described in Example 1, except 3 grams of glycerol (obtained from Alfa Aesar) was used in place of the D-sorbitol. After about 16 hours, the fluid was observed to be a gelled mass, no longer fluid, which could be easily cut with a wooden stick. This gel is similar to a soft gelatin which will not flow under its own weight, and hence clearly would not flow through the funnel in 1 minute if tested using the Fluid-Gel Test described above.

Illustrative Example G

Illustrative Example G was prepared and tested as described in Example 1, except 3 grams of 1,2-propanediol (obtained from Alfa Aesar) was used in place of the D-sorbitol. After about 16 hours, the fluid was observed to be a gelled mass, no longer fluid, which could be easily cut with a wooden stick. This gel is similar to a soft gelatin which will not flow under its own weight, and hence clearly would not flow through the funnel in 1 minute if tested using the Fluid-Gel Test described above.

Illustrative Example H

Illustrative Example H was prepared and tested as described in Example 1, except 3 grams of acetic acid (obtained from J T Baker, Phillipsburg, N.J.) was used in place of the D-sorbitol. After about 16 hours, the fluid was observed to be a gelled mass, no longer fluid, which could be easily cut with a wooden stick. This gel is similar to a soft gelatin which will not flow under its own weight, and hence clearly would not flow through the funnel in 1 minute if tested using the Fluid-Gel Test described above.

Illustrative Example I

Illustrative Example I was prepared and tested as described in Example 1, except 3 grams of glycolic acid (obtained from Aldrich Chemical Company) was used in place of the D-sorbitol. After about 16 hours, the fluid was observed to be a gelled mass, no longer fluid, which could be easily cut with a wooden stick. This gel is similar to a soft gelatin which will not flow under its own weight, and hence clearly would not flow through the funnel in 1 minute if tested using the Fluid-Gel Test described above.

Illustrative Example J

Illustrative Example J was prepared and tested as described in Example 1, except 3 grams of polysorbate (obtained from Uniqema, New Castle, Del. under the trade designation "TWEEN 60" (NF)) was used in place of the D-sorbitol. After about 16 hours, the fluid was observed to be a gelled mass, no longer fluid, which could be easily cut with a wooden stick. This gel is similar to a soft gelatin which will not flow under its own weight, and hence clearly would not flow through the funnel in 1 minute if tested using the Fluid-Gel Test described above.

Illustrative Example K

Illustrative Example K was prepared and tested as described in Example 1, except 3 grams of cetyl alcohol (obtained from The Chemistry Store Dot Com, Cayce, S.C.) was used in place of the D-sorbitol. After about 16 hours, the fluid was observed to be a gelled mass, no longer fluid, which could be easily cut with a wooden stick. This gel is similar to a soft gelatin which will not flow under its own weight, and hence clearly would not flow through the funnel in 1 minute if tested using the Fluid-Gel Test described above.

Illustrative Example L

Illustrative Example L was prepared and tested as described in Example 1, except 3 grams of sorbitan monostearate (obtained from Uniqema under the trade designation "ARLACEL 60") was used in place of the D-sorbitol. After about 16 hours, the fluid was observed to be a gelled mass, no longer fluid, which could be easily cut with a wooden stick. This gel is similar to a soft gelatin which will not flow under its own weight, and hence clearly would not flow through the funnel in 1 minute if tested using the Fluid-Gel Test described above.

Illustrative Example M

Illustrative Example M was prepared and tested as described in Illustrative Example A, except 10 grams of the aqueous drilling fluid was mixed in a 6 dram glass vial with 2.5 grams of an aqueous solution, prepared by mixing 20 grams of deionized water with 10 grams of ceramic microspheres ("3M HOLLOW GLASS MICROSPHERES HGS 18000") and filtering the mixture through Whatman # 5 filter paper (Whatman International Ltd., Maidstone, Kent, UK). After about 20 hours, the fluid was found to be a fluid when tested according to the Fluid-Gel Test described above.

Illustrative Example N

Illustrative Example N was prepared as described in Example M, except 0.3 gram of D-sorbitol was added to the aqueous drilling fluid prior to the addition of the aqueous solution. After about 20 hours, the fluid was found to be a fluid when tested according to the Fluid-Gel Test described above.

Illustrative Example O

Illustrative Example O was prepared by diluting 10 grams of the aqueous drilling fluid with 10 grams of deionized water in a 6 dram vial, and mixing by hand 2 grams of ceramic microspheres ("3M HOLLOW GLASS MICROSPHERES HGS18000"). After about 20 hours, the fluid was found to be a fluid when tested according to the Fluid-Gel Test described above.

Illustrative Example P

Illustrative Example P was prepared and tested as described in Example O, except 0.1 gram of borax (Dial Corp.) was used in place of the glass bubbles. After about 16 hours, the fluid was observed to be a gelled mass, no longer fluid, which could be easily cut with a wooden stick. This gel is similar to a soft gelatin which will not flow under its own weight, and did not pass the Fluid-Gel Test described above.

Various modifications and alterations of this invention will be apparent to those skilled in the art without departing from the scope and spirit of this invention, and it should be understood that this invention is not limited to the illustrative embodiments set forth herein.

What is claimed is:

1. A method of making a modified aqueous fluid the method comprising:
    combining (a) an aqueous fluid comprising polysaccharide and dissolved salt, (b) borate anions comprising at least one boron atom and at least two oxygen atoms, (c) ceramic bubbles, and (d) an organic material selected from the group consisting of glucose, mannose, xylose, fructose, sorbitol, maltitol, maltose, glucosamine, gluconic acid, erythorbic acid, phloroglucinol, glycerol, meso-ertythritol, pentaerythritol, citric acid, 1,1,1-tris (hydroxymethyl)ethane, 1,6-hexanediol, phthalic acid, and hydantoin wherein in the absence of the organic material, the aqueous composition would gel within 16 hours, at 20° C., and wherein the amount of organic material is sufficient to prevent the aqueous composition from gelling within 16 hours, at 20° C.

2. The method according to claim 1, wherein the aqueous fluid and the modified aqueous fluid are drilling fluids.

3. The method according to claim 1, wherein the polysaccharide is at least one of xanthan gum, guar gum, starch, or cellulose.

4. The method according to claim 1, wherein the ceramic bubbles are glass bubbles.

5. A method of making a low density, aqueous fluid, the method comprising:
    combining (a) an aqueous fluid comprising polysaccharide and dissolved salt, (b) borate anions comprising at least one boron atom and at least two oxygen atoms, (c) ceramic bubbles, and (d) an organic material selected from the group consisting of glucose, mannose, xylose, fructose, sorbitol, maltitol, maltose, glucosamine, gluconic acid, erythorbic acid, phloroglucinol, glycerol, meso-ertythritol, pentaerythritol, citric acid, 1,1,1-tris (hydroxymethyl)ethane, 1,6-hexanediol, phthalic acid, and hydantoin wherein in the absence of the organic material, the aqueous composition would gel within 16 hours, at 20° C., and wherein the amount of organic material is sufficient to prevent the aqueous composition from gelling within 16 hours, at 20° C.

6. The method according to claim 5, wherein the aqueous fluid and the low density, aqueous fluid are drilling fluids.

7. The method according to claim 5, wherein the ceramic bubbles are glass bubbles.

8. The method according to claim 5, wherein the polysaccharide is at least one of xanthan gum, guar gum, starch, or cellulose.

9. An aqueous fluid comprising a polysaccharide, an organic material, borate anions, and ceramic bubbles and further comprising the reaction product of (i) the borate anions which borate anions comprise at least one boron atom and at least two oxygen atoms and (ii) the organic material, wherein the organic material is selected from the group consisting of glucose, mannose, xylose, fructose, sorbitol, maltitol, maltose, glucosamine, gluconic acid, erythorbic acid, phloroglucinol, glycerol, meso-ertythritol, pentaerythritol, citric acid, 1,1,1-tris(hydroxymethyl)ethane, 1,6-hexanediol, phthalic acid, and hydantoin wherein in the absence of the organic material, the aqueous composition would gel within 16 hours, at 20° C., and wherein the amount of organic material is sufficient to prevent the aqueous composition from gelling within 16 hours, at 20° C.

10. The aqueous fluid according to claim 9, wherein the ceramic bubbles are glass bubbles.

11. The aqueous fluid according to claim 9, wherein the polysaccharide is at least one of xanthan gum, guar gum, starch, or cellulose.

12. A method of performing drilling operations, the method comprising: circulating an aqueous drilling fluid comprising a polysaccharide, an organic material, borate anions, and ceramic bubbles and further comprising the reaction product of (i) the borate anions which borate anions comprise at least one boron atom and at least two oxygen atoms and (ii) the organic material, wherein the organic material is selected from the group consisting of glucose, mannose, xylose, fructose, sorbitol, maltitol, maltose, glucosamine, gluconic acid, erythorbic acid, phloroglucinol, glycerol, meso-ertythritol, pentaerythritol, citric acid, 1,1,1-tris(hydroxymethyl)ethane, 1,6-hexanediol, phthalic acid, and hydantoin wherein in the absence of the organic material, the aqueous composition would gel within 16 hours, at 20° C., and wherein the amount of organic material is sufficient to prevent the aqueous composition from gelling within 16 hours, at 20° C.

13. The method according to claim 12, wherein the ceramic bubbles are glass bubbles.

* * * * *

UNITED STATES PATENT AND TRADEMARK OFFICE
CERTIFICATE OF CORRECTION

PATENT NO. : 8,324,135 B2
APPLICATION NO. : 12/521096
DATED : December 4, 2012
INVENTOR(S) : Robert William Hunter Page 1 of 1

It is certified that error appears in the above-identified patent and that said Letters Patent is hereby corrected as shown below:

Column 3
Line 19, Delete "diasteromeric)," and insert -- diastereomeric), --, therefor.
Line 55, Delete "polyanioninc" and insert -- polyanionic --, therefor.

Column 13
Line 58, In Claim 1, delete "meso-ertythritol," and insert -- meso-erythritol, --, therefor.

Column 14
Line 14, In Claim 5, delete "meso-ertythritol," and insert -- meso-erythritol, --, therefor.
Line 35, In Claim 9, delete "meso-ertythritol," and insert -- meso-erythritol, --, therefor.
Line 56, In Claim 12, delete "meso-ertythritol," and insert -- meso-erythritol, --, therefor.

Signed and Sealed this
Twenty-sixth Day of February, 2013

Teresa Stanek Rea
*Acting Director of the United States Patent and Trademark Office*